United States Patent
Schneider et al.

(10) Patent No.: US 12,194,480 B2
(45) Date of Patent: Jan. 14, 2025

(54) SWITCHER NOZZLE HIGH EFFICIENCY FLOW INSERT

(71) Applicant: STONEAGE, INC., Durango, CO (US)

(72) Inventors: Joseph A. Schneider, Durango, CO (US); Timothy M. D. Tormey, Hesperus, CO (US)

(73) Assignee: STONEAGE, INC., Durango, CO (US)

( * ) Notice: Subject to any disclaimer, the term of this patent is extended or adjusted under 35 U.S.C. 154(b) by 0 days.

(21) Appl. No.: 17/500,197

(22) Filed: Oct. 13, 2021

(65) Prior Publication Data

US 2022/0062923 A1 Mar. 3, 2022

Related U.S. Application Data

(62) Division of application No. 16/779,123, filed on Jan. 31, 2020, now Pat. No. 11,148,151.

(60) Provisional application No. 62/807,662, filed on Feb. 19, 2019.

(51) Int. Cl.
| | |
|---|---|
| *B05B 1/16* | (2006.01) |
| *B05B 1/02* | (2006.01) |
| *F16L 55/38* | (2006.01) |
| *F16L 101/12* | (2006.01) |
| *F16L 101/50* | (2006.01) |

(52) U.S. Cl.
CPC .............. *B05B 1/1609* (2013.01); *B05B 1/02* (2013.01); *F16L 55/38* (2013.01); *F16L 2101/12* (2013.01); *F16L 2101/50* (2013.01)

(58) Field of Classification Search
CPC .......... B05B 1/1609; B05B 1/02; F16L 55/38; F16L 2101/12; F16L 2101/50
USPC .............................. 239/289, 553–553.5, 600
See application file for complete search history.

(56) References Cited

U.S. PATENT DOCUMENTS 2,184,142 A * 12/1939 Hansen ..................... C12L 3/00
239/557

* cited by examiner

*Primary Examiner* — Christopher S Kim
(74) *Attorney, Agent, or Firm* — Stephen Y. Liu; Carstens, Allen & Gourley, LLP

(57) ABSTRACT

A nozzle assembly includes a hollow nozzle body having a central bore and a plurality of ports extending through the body from the central bore; a switching valve assembly disposed in the central bore that directs fluid flow to ports upon application of fluid flow above a predetermined threshold to the inlet and direct fluid flow to different ports upon fluid flow having subsequently dropped below the predetermined threshold and then exceeding the predetermined threshold; and a flow insert configured to replace the switching valve assembly for directing flow through all of the ports when switching functionality is not needed. This flow insert may be made of a low pressure material such as a polymer.

11 Claims, 4 Drawing Sheets

SWITCHER NOZZLE HIGH EFFICIENCY FLOW INSERT

CROSS REFERENCE TO RELATED APPLICATIONS

This application is a divisional of U.S. patent application Ser. No. 16/779,123, filed Jan. 31, 2020, which claims the benefit of priority of U.S. Provisional Patent Application Ser. No. 62/807,662 filed Feb. 19, 2019, the content of which is hereby incorporated by reference in its entirety.

BACKGROUND OF THE DISCLOSURE

Traction nozzles are used in sewer pipe lines and other piping systems to assist in pulling high pressure hose into the pipe to reach obstructions requiring removal. These traction nozzles have jet tips oriented at an angle rearward in order to generate thrust in the nozzle within the pipe to assist in pulling the hose through and along long stretches of pipe and around pipe bends. These nozzles have forward directed jet tips and may also have laterally directed tips to ablate the obstructions encountered. However, the forward directed jet tips produce a force counter to the forward travel of the nozzle through the pipe. This counterforce hinders effective deployment of the high pressure hose and reduces the net pulling force produced by the traction nozzle on the high pressure hose. Thus there is a need for a switching mechanism that does not generate a counterforce during traction operation, yet facilitates operation of an effective fluid jet nozzle during actual cleaning operations. Furthermore, there is a need for a nozzle assembly incorporating a switching valve assembly that is replaceable and has a minimum number of component parts in order to simplify design and maintenance of such a nozzle assembly. There is also a need for a simplified nozzle assembly for use in those situations where a functioning switching valve is not needed, yet improves the efficiency of operation of the nozzle.

SUMMARY OF THE DISCLOSURE

An exemplary embodiment of a nozzle assembly in accordance with the present disclosure includes a hollow nozzle head body having a central bore containing a switching valve assembly captured in the body by an inlet nut fastened to the nozzle head body. The valve assembly includes a movable poppet disposed in the central bore, a guide member in the bore, and a bias member in the bore between the nozzle head body and the poppet resiliently biasing the poppet toward the inlet nut at a rear end of the central bore.

This nozzle assembly more particularly includes a hollow nozzle body having a front portion and a rear portion, a central bore through the rear portion, and a plurality of ports extending out of the nozzle body through the front portion of the body from the central bore. A switching valve assembly is disposed in the central bore. This assembly is operable to direct fluid flow from an inlet to the rear portion to at least one of the plurality of ports upon application of fluid flow above a predetermined threshold to the inlet and direct fluid flow from the inlet to at least a different one of the plurality of ports upon fluid flow having subsequently dropped below the predetermined threshold and then exceeding the predetermined threshold. A high efficiency flow insert is provided that is configured to replace the switching valve assembly when flow switching is not needed, and which maximizes jet force, coherence and cohesiveness of the fluid jets exiting the ports.

An embodiment in accordance with the present disclosure may be viewed as a nozzle assembly including an inlet nut fastenable to a distal end of one of a rotatable nozzle shaft or a high pressure hose, a hollow nozzle body having a front portion, a rear inlet portion configured to engage the inlet nut, a central bore through at least the rear portion of the nozzle body, and a plurality of ports extending through the body from the central bore. The nozzle body is configured to receive a switching valve assembly in the central bore. The switching valve assembly includes a movable poppet captured in the nozzle body by the inlet nut. The switching valve assembly also includes a guide member within the central bore and a bias member in the bore between the nozzle body and the poppet resiliently biasing the poppet toward the inlet nut at a rear end of the central bore. The nozzle body is configured to withstand an operating pressure of greater than about 5000 psi; and is configured to have a generally cylindrical flow insert disposed in the central bore between the inlet nut and at least the rear portion of the nozzle body when switching functionality is not required.

This insert has a plurality of through passages configured to communicate with the nozzle ports. Importantly, the flow insert need not withstand the typical high pressures present during nozzle operation since the nozzle body is the pressure vessel rather than the insert. Preferably the flow insert in the nozzle assembly is made of a polymer such as a plastic or nylon polymer, or could also be a 3D printed metal body. However, a metal flow insert in accordance with this disclosure could alternatively be made by other processes such as casting, machining, forming, etc. The flow insert has a peripheral axial groove engaging the guide member when the switchable valve assembly is replaced by the generally cylindrical flow insert.

Alternatively, a nozzle assembly in accordance with the present disclosure may be viewed as including an inlet nut fastenable to a hollow shaft or a high pressure hose, a hollow nozzle body having a front portion, a rear inlet portion configured to engage the inlet nut, a central bore through at least the rear inlet portion of the nozzle body, and a plurality of ports extending through the body from the central bore, wherein the nozzle body is configured to withstand an operating pressure of at least 5 k psi. A switching valve assembly is removably captured within at least a rear portion of the central bore of the nozzle body by the inlet nut. A generally cylindrical flow insert is configured to be disposed within the central bore in place of the switching valve assembly when switching functionality of the switching valve assembly is not needed, wherein the flow insert has a plurality of through passages each configured to communicate with at least one of the ports and wherein the flow insert is not designed to withstand high pressure operation when not installed and captured within the central bore of the hollow nozzle body.

The nozzle body has a plurality of the ports that exit the front end portion of the nozzle body from the central bore and a plurality of the ports that exit laterally from the nozzle body. The nozzle body has one or more guide pins protruding into the central bore to orient the switching valve assembly therein and also to orient the flow insert when it is installed within the central bore in place of the switching valve assembly. The flow insert has one or more axial grooves each for engaging one of the one or more guide pins. Preferably the flow insert has two axial through passages configured to align with the plurality of ports exiting the front end portion of the nozzle body from the central bore.

Also, the flow insert has two axial through passages configured to align with the ports exiting laterally from the nozzle body.

Alternatively, an embodiment in accordance with the present disclosure may be viewed as a polymer flow insert for use in a switcher valve nozzle assembly including an inlet nut, a hollow nozzle body having a front portion, a rear inlet portion configured to engage the inlet nut, a central bore through at least the rear inlet portion of the nozzle body, and a plurality of ports extending through the body from the central bore. The nozzle body is configured to withstand an operating pressure of at least 5 k psi, and includes a switching valve assembly removably captured within at least a rear portion of the central bore of the nozzle body by the inlet nut.

The polymer flow insert includes a generally cylindrical body configured to be disposed within the central bore in place of the switching valve assembly when switching functionality of the switching valve assembly is not needed. The flow insert has a plurality of through passages each configured to communicate with at least one of the ports. The flow insert may be made of a material to withstand substantially less than 5000 psi when not installed and captured within the central bore of the hollow nozzle body, such as a polymer, since the insert does not act as a pressure vessel.

Preferably a plurality of the nozzle body ports exit the front end portion of the nozzle body from the central bore and a plurality of the ports exit laterally from the nozzle body. The nozzle body has one or more guide pins protruding into the central bore to orient the switching valve assembly therein and to orient the flow insert when it is installed within the central bore. Correspondingly, the flow insert has one or more peripheral axial grooves each for engaging each one of the one or more guide pins. The flow insert has two axial through passages configured to align with the plurality of ports exiting the front end portion of the nozzle body from the central bore.

Stated another way, the flow insert has two axial through passages configured to align with ports exiting the front end portion of the nozzle body and two axial through passages configured to align with ports exiting laterally from the nozzle body. Preferably the flow insert includes at least one groove axially extending along an exterior of the generally cylindrical flow insert body for receiving a guide pin projecting from the nozzle body into the central bore to orient the flow insert in the central bore. The flow insert may also include at least one groove axially extending along an exterior of the generally cylindrical flow insert body for receiving a guide pin projecting from the nozzle body into the central bore to orient the flow insert in the central bore.

Further features, advantages and characteristics of the embodiments of this disclosure will be apparent from reading the following detailed description when taken in conjunction with the drawing figures.

DETAILED DESCRIPTION

Figure 1:
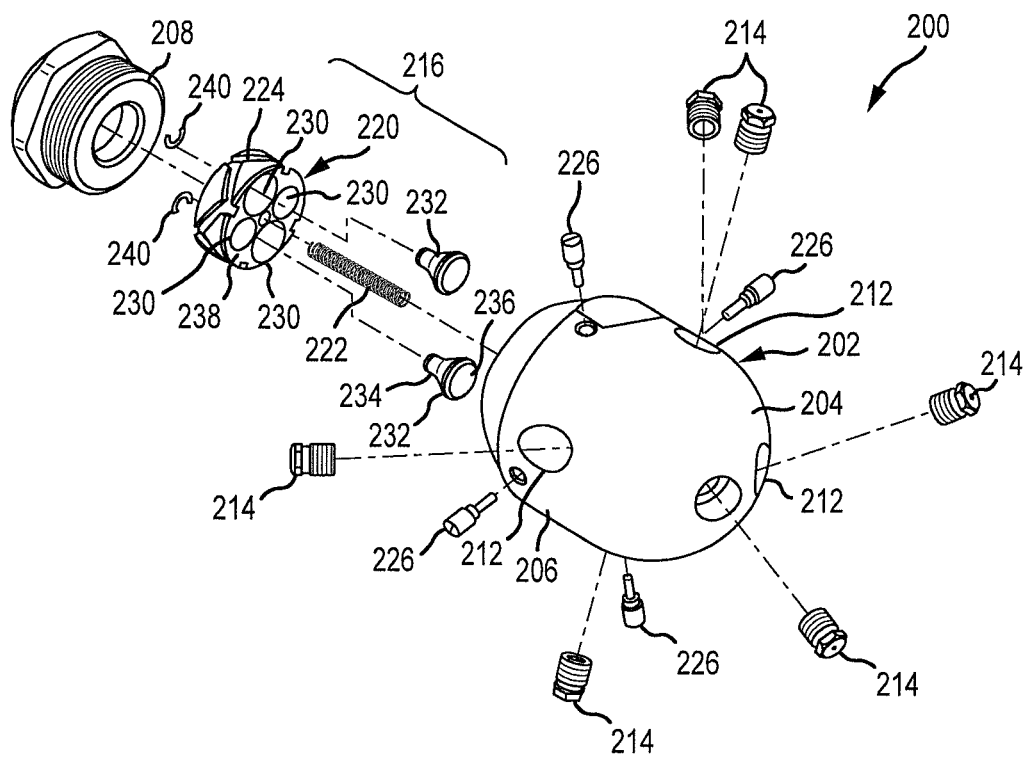
FIG. 1 is an exploded view of a switching nozzle head assembly in accordance with an embodiment of the present disclosure.

An exemplary first embodiment of a nozzle assembly 200 incorporating a switching valve assembly is shown in FIG. 1. The nozzle assembly 200 has a generally cylindrical solid nozzle body 202 with a front portion 204 which typically has a rounded nose and a generally cylindrical rear portion 206 that can be threadably fastened to an inlet nut 208, which is, in turn, fastened to a rotary shaft and thence to a high pressure fluid hose (not shown). This nozzle body 202 is typically made of metal such as steel and can withstand fluid pressures in excess of 20 k-40 k psi. The nozzle body 202 has a central bore 210 through at least the rear portion 206 of the nozzle body 202 and a plurality of ports 212 drilled through the body 202 each leading from the central bore 210 to a nozzle tip 214 that is threaded into each of the ports 212.

Captured in the central bore 210 between the front portion 204 and the inlet nut 208 in this embodiment is a switching valve assembly 216. This switching valve assembly 216 includes a cylindrical poppet 220 slidably disposed in the central bore 210, a bias member 222 compressed between the poppet 220 and the front portion 204, and a guide 224 between the poppet 220 and the nozzle body 202.

In this embodiment of the nozzle assembly 200, the guide 224 comprises a groove in the poppet 220 that engages a plurality of guide pins 226 that are threaded into the body 202 and extend into the central bore 210. The groove 224 is a peripheral zig-zag groove formed in the outer cylindrical surface of the poppet 220. There are four guide pins 226 spaced at 90 degrees apart around the central bore 210. When fluid flow is applied to the assembled nozzle 200, the poppet 220 slides within the bore 210 forward toward the front portion 204 of the nozzle body 202, being rotated as it moves via the guide 224 until its front end face 238 abuts against the rear face of the front portion 204 at the end of the central bore 210.

The poppet 220 is a short cylindrical body that has four axially extending bores 230 symmetrically arranged around its central axis. Two oppositely arranged bores 230 carry floating valve pins 232. These valve pins 232 are used to close corresponding aligned passages 228 through the front portion 204 of the nozzle body 202. Each valve pin 232 has a stem 234 and an enlarged plug portion 236 extend from a front face 238 of the poppet 220 giving the valve pin an external shape like an Erlenmeyer flask. The valve pins 232 are each captured within its bore 230 via a snap ring 240 fastened to the stem 234 of the valve pin 232 such that the valve pin 232 floats within its bore through the poppet 220. This floating configuration with an enlarged plug or lug end portion 236 accommodates for tolerance stacking of the nozzle switching valve 216 components. Further, an O-ring seal (not shown) may be installed between the chamfer of the enlarged plug portion 236 and the front portion 204 of the nozzle body 202 to provide a positive seal.

Figure 2:
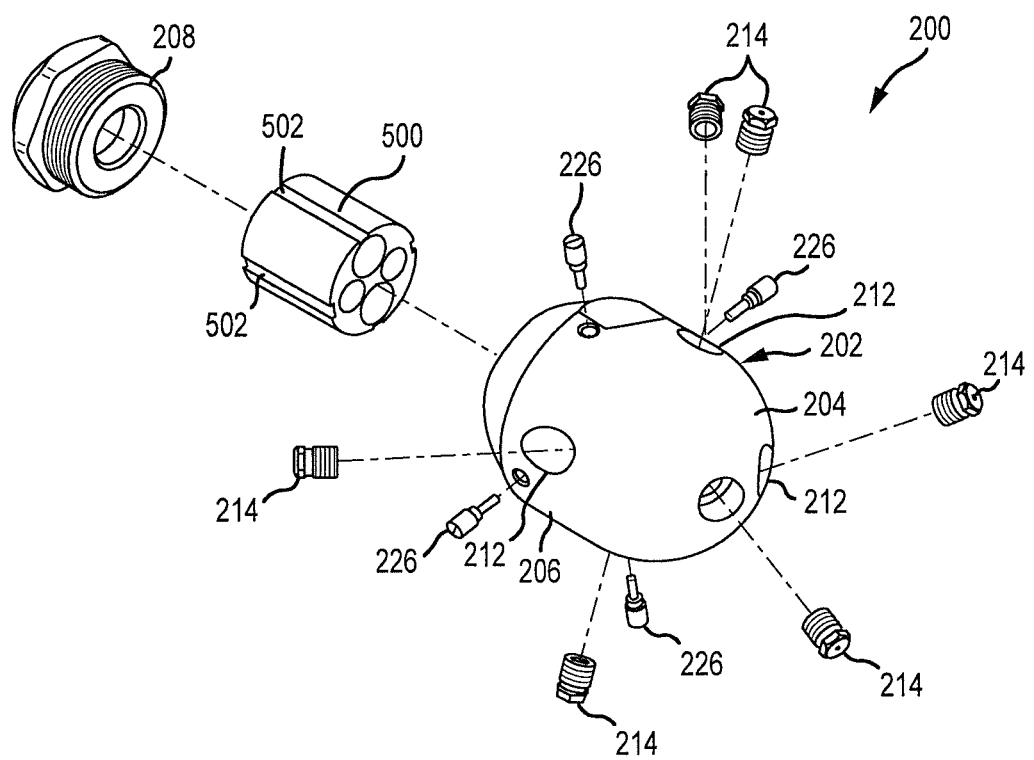
FIG. 2 an exploded view of the switching nozzle head assembly shown in FIG. 1 with a high efficiency flow insert replacing the switching poppet for use in the head assembly in accordance with the present disclosure.

FIG. 2 shows a switching nozzle 200 as above described, except that the switching cartridge 216 is replaced with a flow insert 500. This flow insert 500 is a solid cylindrical body that has four axial grooves 502 in its exterior surface that are aligned to receive the tips of guide pins 226 when the insert 500 is installed within the rear portion 206 of the nozzle body 202.

Figure 3:
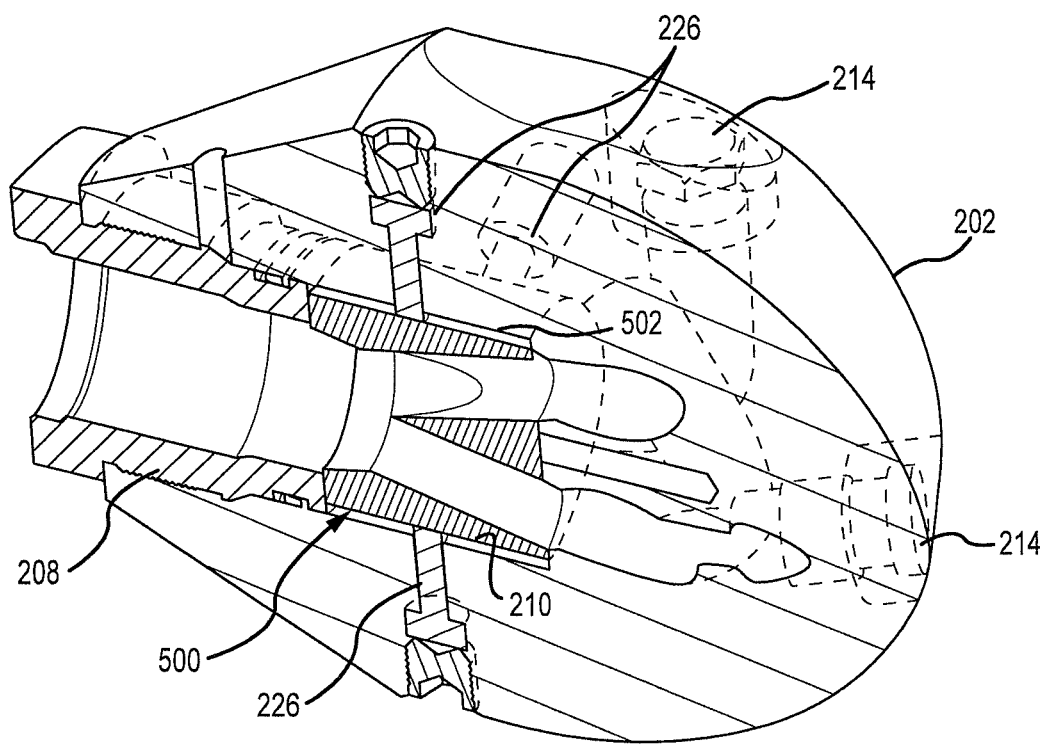
FIG. 3 is a perspective view of the assembly shown in FIG. 2 with a portion sectioned.

FIG. 3 is perspective view of the assembled nozzle 200 in FIG. 2 with the insert 500 installed and partially shown in section, showing the tips of the pins 226 engaging the slots 502. Since the insert 500 is essentially cylindrical these pins 226 ensure that the insert 500 remains properly aligned with the ports 212. The insert 500 is captured within the rear portion 206 between the inlet nut 208 and the front end portion 204 of the nozzle body 202. The insert 500 has a convergent rear chamber portion 504 that divides preferably equally into four passages that smoothly direct flow to the tractor ports 212.

Figure 4:
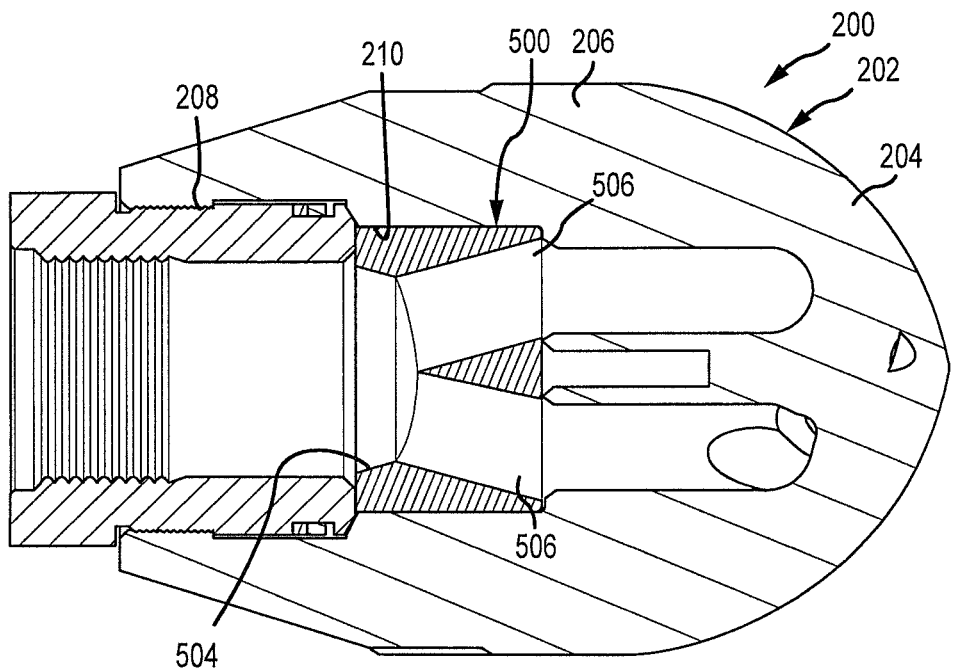
FIG. 4 is an axial cross sectional view through the nozzle assembly as in FIG. 2, showing the insert directing flow to the tractor ports.

FIG. 4 is an axial cross-sectional view through the nozzle 200 with insert 500 installed and directed through the rear chamber portion 504 into two passages 506 to the tractor ports 212.

Figure 5:
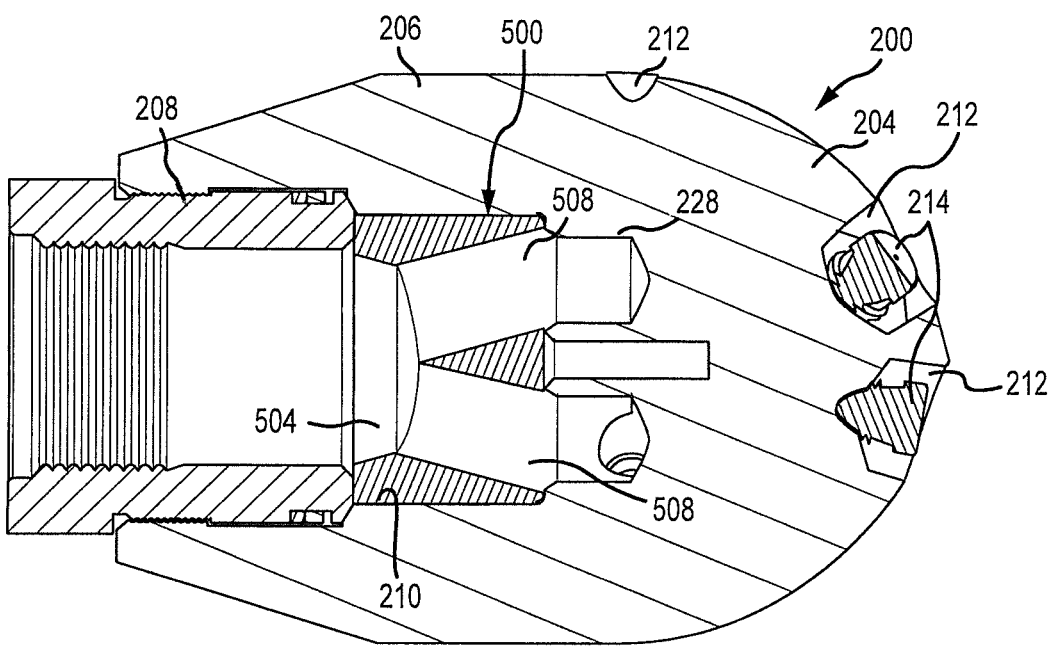
FIG. 5 is an axial cross sectional view through the nozzle assembly as in FIG. 2 but rotated 90 degrees, showing the passages through the insert to the cleaning ports.

FIG. 5 is an axial cross sectional view through the nozzle 200 with insert 500 installed, but rotated 90 degrees, showing the other two passages 508 that smoothly direct flow from the inlet nut 208, through the convergent chamber portion 504, through the other two passages 508 to the lateral and front cleaning ports 212. When the flow insert 500 is installed in the nozzle body 202, the flow into the head 202 is directed to all of the ports without restriction so as to minimize flow losses and thus the fluid flow is ejected from the ports 212 with maximum force.

The flow insert 500 may be made from a metal or a polymeric material or a composite, and may be 3D printed, as this component does not have to withstand or contain the applied fluid pressure exerted on the nozzle 200. That function is carried out by the nozzle head 202 itself into which the insert 500 is installed. Typically nozzles 200 are designed to handle fluid pressures in ranges of 10 k psi, 20 k psi and 40 k psi and more. The advantage of the flow insert 500 in accordance with the present disclosure is that it does not need to withstand such pressures. It can be made of a much softer, more pliable or even brittle material that is easy to manufacture, since it is constrained in the nozzle body 202.

Other arrangements of the insert 500 may be made. For example, the convergent portion 504 may be reduced or enlarged, depending on the flow characteristics desired. Similarly, the passages 506 and 508 may be shaped other than with straight as shown. Also, the passages 506 may be smaller in cross section than the passages 508. All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. A nozzle comprising:
    an inlet nut fastenable to a distal end of one of a rotatable nozzle shaft or a hose configured to convey pressurized liquid;
    a hollow nozzle body having a front end portion, a cylindrical rear inlet portion configured to engage the inlet nut, a central bore through at least the cylindrical rear inlet portion of the nozzle body, and a plurality of ports extending through the body from the central bore; and
    a generally cylindrical removable flow insert disposed in the central bore between the inlet nut and at least the rear inlet portion of the nozzle body, the insert having a plurality of through passages, wherein each of the plurality of through passages communicates only with a respective one of the plurality of ports.

2. The nozzle according to claim 1 wherein the removable flow insert cannot withstand a nozzle operating pressure above 5 k psi when not installed within the central bore of the nozzle body.

3. The nozzle according to claim 2 wherein the insert is made of nylon.

4. The nozzle according to claim 1 wherein the insert is made of plastic.

5. The nozzle according to claim 1 wherein the nozzle body is configured to receive a removable switching valve assembly in the central bore in place of the removable flow insert, the removeable switching valve assembly including a movable poppet captured in the nozzle body by the inlet nut, the removeable switching valve assembly including a guide member within the bore and a bias member in the bore between the nozzle body and the poppet resiliently biasing the poppet toward the inlet nut at a rear end of the central bore, wherein the moveable poppet has a peripheral groove engaging the guide member when the removeable switching valve assembly replaces the generally cylindrical removeable flow insert.

6. The nozzle of claim 5, wherein the nozzle body has one or more guide pins protruding into the central bore, wherein the one or more guide pins are configured to orient the removeable switching valve assembly when received therein and to orient the flow insert when the flow insert is installed within the central bore.

7. The nozzle of claim 6, wherein the flow insert has one or more axial grooves each for engaging each one of the one or more guide pins.

8. The nozzle of claim 1, wherein a first subset of the plurality of the ports exits the front end portion of the nozzle body from the central bore and a second subset of the plurality of the ports exits laterally from the nozzle body.

9. The nozzle of claim 8, wherein the plurality of through passages includes two axial through passages configured to align with the first subset of the plurality of ports.

10. The nozzle of claim 8, wherein the plurality of through passages includes two axial through passages configured to align with the second subset of the plurality of ports.

11. The nozzle of claim 1, wherein the nozzle body is configured to withstand an operating pressure of greater than 5 k psi.

* * * * *